United States Patent
Patil et al.

(10) Patent No.: US 9,587,164 B2
(45) Date of Patent: Mar. 7, 2017

(54) COMPOSITION FOR STABILIZING UNCONSOLIDATED FORMATION AND FINES AGGLOMERATION

(71) Applicant: Halliburton Energy Services, Inc., Houston, TX (US)

(72) Inventors: Prajakta Ratnakar Patil, Pune (IN); Shoy George Chittattukara, Thrissur (IN); Prasanta Das, Laskarpur (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/397,034

(22) PCT Filed: Sep. 20, 2013

(86) PCT No.: PCT/US2013/060793
§ 371 (c)(1),
(2) Date: Oct. 24, 2014

(87) PCT Pub. No.: WO2015/041661
PCT Pub. Date: Mar. 26, 2015

(65) Prior Publication Data
US 2016/0251562 A1     Sep. 1, 2016

(51) Int. Cl.
*C09K 8/506*     (2006.01)
*E21B 43/16*     (2006.01)
(Continued)

(52) U.S. Cl.
CPC .............. *C09K 8/506* (2013.01); *C09K 8/508* (2013.01); *C09K 8/575* (2013.01); *E21B 43/16* (2013.01);
(Continued)

(58) Field of Classification Search
None
See application file for complete search history.

(56) References Cited

U.S. PATENT DOCUMENTS

| 6,016,870 A | 1/2000 | Dewprashad et al. |
| 7,156,194 B2 | 1/2007 | Nguyen |

(Continued)

OTHER PUBLICATIONS

International Preliminary Report on Patentability issued in related PCT application No. PCT/US2013/060793, mailed Mar. 31, 2016, 10 pages.

(Continued)

*Primary Examiner* — John J Figueroa
(74) *Attorney, Agent, or Firm* — Craig W. Roddy; Baker Botts L.L.P.

(57) ABSTRACT

Methods for treating a zone of a subterranean formation penetrated by a wellbore comprising: (A) forming a treatment fluid comprising: (i) an aqueous continuous phase; (ii) a first chemical having: (a) a single epoxy group; and (b) at least one alkoxy group on a silicon atom, wherein the first chemical is water soluble or dissolves with hydrolysis in the aqueous continuous phase; (iii) a second chemical having an amine group, wherein the second chemical is water soluble or dissolves with hydrolysis in the aqueous continuous phase; and (B) introducing the treatment fluid through the wellbore into the zone of the subterranean formation. In various embodiments, the treatment fluid has a viscosity of less than 5 cP measured at a shear rate of 511 sec$^{-1}$.

20 Claims, 1 Drawing Sheet

(51) Int. Cl.
    *E21B 43/26*    (2006.01)
    *C09K 8/508*    (2006.01)
    *C09K 8/575*    (2006.01)
    *E21B 43/04*    (2006.01)
    *E21B 43/08*    (2006.01)

(52) U.S. Cl.
    CPC .............. *E21B 43/26* (2013.01); *E21B 43/04* (2013.01); *E21B 43/08* (2013.01)

(56) References Cited

U.S. PATENT DOCUMENTS

| | | |
|---|---|---|
| 2010/0160187 A1 | 6/2010 | Nguyen et al. |
| 2010/0212898 A1 | 8/2010 | Nguyen et al. |
| 2011/0257051 A1* | 10/2011 | Welton .................. C09K 8/502 507/220 |
| 2012/0012320 A1 | 1/2012 | Weaver et al. |

OTHER PUBLICATIONS

International Search Report and Written Opinion dated Jun. 23, 2014 for Application No. PCT/US2013/060793.

* cited by examiner

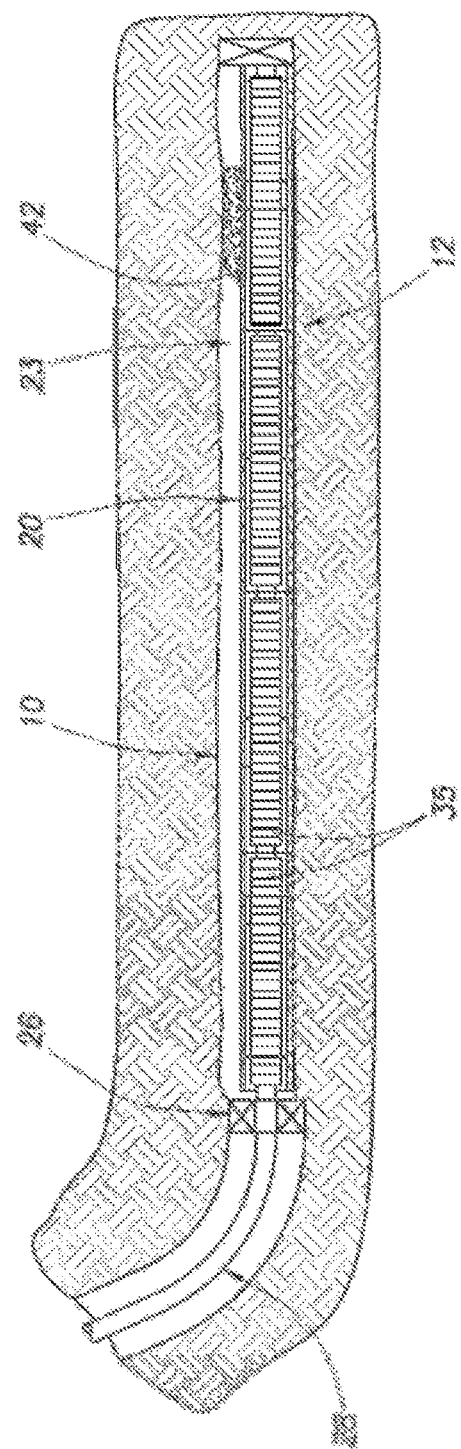

COMPOSITION FOR STABILIZING UNCONSOLIDATED FORMATION AND FINES AGGLOMERATION

CROSS-REFERENCE TO RELATED APPLICATIONS

Not Applicable.

TECHNICAL FIELD

The disclosure generally relates to producing oil or gas from a subterranean formation. More specifically, the disclosure relates to compositions and methods for use in treating a subterranean formation for controlling the migration of particulates, such as formation sand and fines.

BACKGROUND

Oil or gas is obtained from a subterranean formation by drilling a wellbore that penetrates a hydrocarbon-bearing formation. It is desirable to maximize both the rate of flow and the overall amount of flow of hydrocarbon from the subterranean formation to the surface.

One way that the rate of hydrocarbon flow and the overall amount of hydrocarbon flow can be reduced is by fines production or sand migration in the formation or by precipitation. The relatively high velocity in the permeable matrix of the subterranean formation near the wellbore is sometimes sufficient to mobilize particulates. These particulates can be carried and then plug flow channels in the formation, a proppant pack, or a gravel pack. It is desirable to minimize fines or sand migration, since such particulates block flow paths, choking the potential production of the well. In addition, such particulates can damage downhole and surface equipment, such as screens, pumps, flow lines, storage facilities, etc.

Wellbores often penetrate subterranean formations that contain unconsolidated particulates that may migrate when oil, gas, water, or other fluids are produced or flowed back from the subterranean formation.

Devices such as screens and slotted liners are often used to provide support for these unconsolidated formations to inhibit formation collapse. Usually, the annulus around the support device is gravel packed to reduce the presence of voids between the device and the borehole. Typically, such gravel packing operations involve the pumping and placement of a quantity of a desired size of particulate material into the annulus between the tubular device and the borehole of the wellbore. Gravel packing forms a filtration bed near the wellbore that acts as a physical barrier to the transport of unconsolidated formation fines with the production of hydrocarbons. These support devices provide support for the wellbore and gravel packing and prevent some fines from entering the hydrocarbon flow into the well.

Some types of screens are adapted to be expanded to contact the wellbore wall either with or without gravel packing. It is however, impossible to eliminate all voids between the screen and the wellbore wall. Fines fill these voids blocking flow and in some instances fines flowing through these voids erode the screen destroying its effectiveness.

One common type of gravel packing operation involves placing a gravel pack screen in the wellbore and packing the surrounding annulus between the screen and the wellbore with gravel of a specific mesh size designed to prevent the passage of formation sand or fines. The gravel pack screen is generally a filter assembly used to retain the gravel placed during gravel pack operation. A wide range of sizes and screen configurations are available to suit the characteristics of the gravel pack sand. Similarly, a wide range of gravel sizes is available to suit the characteristics of the unconsolidated or poorly consolidated particulates in the subterranean formation. The resulting structure presents a barrier to migrating sand from the formation while still permitting fluid flow.

Gravel packs can be time consuming and expensive to install. Due to the time and expense needed, it is sometimes desirable to place a screen without the gravel and, particularly in cases in which an expandable screen is being placed, it may be unrealistic to place a bed of gravel between the expandable screen and the wellbore. Even in circumstances in which it is practical to place a screen without a gravel pack, it is often difficult to determine an appropriate screen size to use as formation sands tend to have a wide distribution of sand grain sizes. When small quantities of sand are allowed to flow through a screen, screen erosion becomes a significant concern. As a result, the placement of gravel as well as the screen is often necessary to control the formation sands.

An expandable screen is often installed to maintain the diameter of the wellbore for ease of access at a later time by eliminating installation of conventional screens, gravel placement, and other equipment. However, the ability to provide universal screen mesh that can handle wide particle size distribution of formation sand is unrealistic, if not impossible.

Another method used to control particulates in unconsolidated formations involves consolidating a subterranean producing zone into hard, permeable masses. Consolidation of a subterranean formation zone often involves applying a resin followed by a spacer fluid and then a catalyst. Such resin application may be problematic when, for example, an insufficient amount of spacer fluid is used between the application of the resin and the application of the external catalyst. The resin may come into contact with the external catalyst in the wellbore itself rather than in the unconsolidated subterranean producing zone. When resin is contacted with an external catalyst, an exothermic reaction occurs that may result in rapid polymerization, potentially damaging the formation by plugging the pore channels, halting pumping when the wellbore is plugged with solid material, or resulting in a downhole explosion as a result of the heat of polymerization. Also, these conventional processes are not practical to treat long intervals of unconsolidated regions due to the difficulty in determining whether the entire interval has been successfully treated with both the resin and the external catalyst. Gravel packing is a costly operation and resin placement can sometimes damage the formation.

In addition to the unconsolidated formation sands often found in subterranean formations, particulate materials are often introduced into subterranean zones in conjunction with conductivity enhancing operations and sand control operations. Conductivity enhancing and sand control operations may be performed as individual treatments, or may be combined where desired.

Preventing formation sand and fines from migrating from an unconsolidated formation has always been a challenge. While previously known treatment methods for unconsolidated formation provide improved particulate control, multiple treatment steps that are time consuming and expensive are usually required. Therefore, it is desirable to develop relatively simple and relatively inexpensive treatment compositions and methods to improve or maintain the rate of fluid flow while reducing particulate migration.

SUMMARY OF THE DISCLOSURE

In general, methods for treating a zone of a subterranean formation penetrated by a wellbore are provided, the methods comprising: (A) forming a treatment fluid comprising: (i) an aqueous continuous phase; (ii) a first chemical having: (a) a single epoxy group; and (b) at least one alkoxy group on a silicon atom, wherein the first chemical is water soluble or dissolves with hydrolysis in the aqueous continuous phase; (iii) a second chemical having an amine group, wherein the second chemical is water soluble or dissolves with hydrolysis in the aqueous continuous phase; and (B) introducing the treatment fluid through the wellbore into the zone of the subterranean formation.

In various embodiments of methods according to the disclosure, the treatment fluid has a viscosity of less than 5 cP measured at a shear rate of 511 $sec^{-1}$.

In various embodiments of methods according to the disclosure, the treatment fluid does not include a resin.

The disclosed methods can be used, for example, with any mechanical sand control device, such as a perforated liner, a slotted pipe, a wire-wrapped screen, a non-expandable screen, and an expandable screen. The disclosed methods can be used with or without gravel packing. Preferably, the methods are used without gravel packing.

These and other aspects of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed, but, on the contrary, the disclosure is to cover all modifications and alternatives falling within the scope of the disclosure as expressed in the appended claims.

BRIEF DESCRIPTION OF DRAWING

The accompanying drawing is incorporated into the specification to help illustrate examples according to the presently most-preferred embodiment of the invention.

FIG. 1 is a schematic, cross-sectional view of an exemplary configuration operating environment in which the inventions of the present invention can be used depicting a screened and gravel packed portion of the wellbore extending into an unconsolidated subterranean hydrocarbon formation. It should be understood that gravel packing is not necessary. In addition, it should be understood that this FIGURE of the drawing is not necessarily to scale.

DETAILED DESCRIPTION OF PRESENTLY PREFERRED EMBODIMENTS AND BEST MODE

Definitions and Usages
General Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables and other scientific symbols used herein are selected arbitrarily or according to convention. Other algebraic variables can be used.

Subterranean Formations and Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

In geology, rock or stone is a naturally occurring solid aggregate of minerals or mineraloids. The Earth's outer solid layer, the lithosphere, is made of rock. Three major groups of rocks are igneous, sedimentary, and metamorphic. The vast majority of reservoir rocks are sedimentary rocks, but highly fractured igneous and metamorphic rocks can sometimes be reservoirs.

A consolidated formation is a geologic material for which the particles are stratified (layered), cemented, or firmly packed together (hard rock); usually occurring at a depth below the ground surface. An unconsolidated formation is a sediment that is loosely arranged or unstratified (not in layers) or whose particles are not cemented together (soft rock); occurring either at the ground surface or at a depth below the surface. In an unconsolidated or weakly consolidated formation, some particulates are insufficiently bonded in the formation to withstand the forces produced by the production or flowback of fluids through the matrix of the formation.

As used herein, a subterranean formation having greater than about 50% by weight of inorganic siliceous materials (e.g., sandstone) is referred to as a "sandstone formation."

There are conventional and non-conventional types of reservoirs. In a conventional reservoir, the hydrocarbons flow to the wellbore in a manner that can be characterized by flow through permeable media, where the permeability may or may not have been altered near the wellbore, or flow through permeable media to a permeable (conductive), bi-wing fracture placed in the formation. A conventional reservoir would typically have a permeability greater than about 1 milliDarcy (equivalent to about 1,000 microDarcy).

Wells, Well Servicing, Treatment Fluids, and Treatment Zones

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, a "fluid" broadly refers to any fluid adapted to be introduced into a well for any purpose. A fluid can be, for example, a drilling fluid, a setting composition, a treatment fluid, or a spacer fluid. If a fluid is to be used in a relatively small volume, for example less than about 200 barrels (about 8,400 US gallons or about 32 m$^3$), it is sometimes referred to as a wash, dump, slug, or pill.

As used herein, the word "treatment" refers to any treatment for changing a condition of a portion of a wellbore, or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

The term "damage" as used herein regarding a subterranean formation refers to undesirable deposits in a subterranean formation that may reduce its permeability. Scale, skin, gel residue, hydrates, and resin damage, are contemplated by this term.

The term "sand control device" is used generically herein and is meant to include and cover all types of similar structures which are commonly used in gravel pack well completions which permit flow of fluids through the "screen" while blocking the flow of particulates (e.g., commercially-available screens; slotted or perforated liners or pipes; sintered-metal screens; sintered-sized, mesh screens; screened pipes; pre-packed screens, radially-expandable screens or liners; or combinations thereof).

Generally, the greater the depth of the formation, the higher the static temperature and pressure of the formation. Initially, the static pressure equals the initial pressure in the formation before production. After production begins, the static pressure approaches the average reservoir pressure.

Deviated wells are wellbores inclined at various angles to the vertical. Complex wells include inclined wellbores in high-temperature or high-pressure downhole conditions.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid or treatment is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Phases and Physical States

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), e.g., microscopic clay particles, to about 3 millimeters, e.g., large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

It should be understood that the terms "particle" and "particulate," includes all known shapes of particles including substantially rounded, spherical, oblong, ellipsoid, rod-like, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

A particulate will have a particle size distribution ("PSD"). As used herein, "the size" of a particulate can be determined by methods known to persons skilled in the art.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Particulates smaller than about 400 U.S. Standard Mesh are usually measured or separated according to other methods because small forces such as electrostatic forces can interfere with separating tiny particulate sizes using a wire mesh.

The most commonly-used grade scale for classifying the diameters of sediments in geology is the Udden-Wentworth scale. According to this scale, a solid particulate having particles smaller than 2 mm in diameter is classified as sand, silt, or clay. Sand is a detrital grain between 2 mm (equivalent to 2,000 micrometers) and 0.0625 mm (equivalent to 62.5 micrometers) in diameter. (Sand is also a term sometimes used to refer to quartz grains or for sandstone.) Silt refers to particulate between 74 micrometers (equivalent to about −200 U.S. Standard mesh) and about 2 micrometers. Clay is a particulate smaller than 0.0039 mm (equivalent to 3.9 μm).

As used herein, "fines" refers to solid particulates that are smaller than most sand particulates, and generally less than about 50 micrometers.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

An "oil-based" fluid means that oil is the dominant material by weight of the continuous phase of the fluid. In this context, the oil of an oil-based fluid can be any oil.

In the context of a fluid, oil is understood to refer to any kind of oil in a liquid state, whereas gas is understood to refer to a physical state of a substance, in contrast to a liquid. In this context, an oil is any substance that is liquid under Standard Laboratory Conditions, is hydrophobic, and soluble in organic solvents. Oils typically have a high carbon and hydrogen content and are non-polar substances. This general definition includes classes such as petrochemical oils, vegetable oils, and many organic solvents. All oils, even synthetic oils, can be traced back to organic sources.

Solubility

The term "solution" is intended to include not only true molecular solutions but also dispersions of a polymer wherein the polymer is so highly hydrated as to cause the dispersion to be visually clear and having essentially no particulate matter visible to the unaided eye. The term "soluble" is intended to have a meaning consistent with these meanings of solution.

As used herein, a substance is considered to be "soluble" in a liquid if at least 1 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Therefore, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Like other physical properties, the viscosity of a Newtonian fluid or the apparent viscosity of a non-Newtonian fluid may be highly dependent on the physical conditions, primarily temperature and pressure.

Viscosity Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or Model 50 viscometer or a CHANDLER™ Model 5550 HPHT viscometer. Such a viscometer measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

In general, a FANN™ Model 35 viscometer is used for viscosity measurements of less than about 30 mPa·s (cP). The Model 35 does not have temperature and pressure controls, so it is used for fluids at ambient conditions (that is, Standard Laboratory Conditions). However, with an optional heating cup, viscosity can be measured at higher temperatures so long as the temperature is below the boiling point of the solvent. Except to the extent otherwise specified, the apparent viscosity of a fluid having a viscosity of less than about 30 cP (excluding any suspended solid particulate larger than silt) is measured with a FANN™ Model 35 type viscometer with a bob and cup geometry using an R1 rotor, B1 bob, and F1 torsion spring at a shear rate of 511 sec$^{-1}$ (300 rpm) and at a temperature of 77° F. (25° C.) and a pressure of 1 atmosphere.

Permeability

Permeability refers to how easily fluids can flow through a material. For example, if the permeability is high, then fluids will flow more easily and more quickly through the material. If the permeability is low, then fluids will flow less easily and more slowly through the material. As used herein, unless otherwise specified, permeability is measured with light oil having an API gravity of greater than 31.1 degrees.

For gas wells, "high permeability" means the matrix of a subterranean formation has a permeability of at least 10 millidarcy (mD) and "low permeability" means the matrix has a permeability of less than 1 mD. For oil wells, "high permeability" means the matrix of a subterranean formation has a permeability of at least 30 mD and "low permeability" means the matrix has a permeability of less than 10 mD. For gravel packing, "high permeability" means the matrix of a subterranean formation has a permeability of at least 500 mD and "low permeability" means the matrix has a permeability of less than 50 mD.

General Approach

Methods for treating a zone of a subterranean formation penetrated by a wellbore are provided, the methods comprising: (A) forming a treatment fluid comprising: (i) an aqueous continuous phase; (ii) a first chemical having: (a) a single epoxy group; and (b) at least one alkoxy group on a silicon atom, wherein the first chemical is water soluble or dissolves with hydrolysis in the aqueous continuous phase; (iii) a second chemical having an amine group, wherein the second chemical is water soluble or dissolves with hydrolysis in the continuous phase; and (B) introducing the treatment fluid through the wellbore into the zone of the subterranean formation.

In various embodiments, the treatment fluid includes less than 5% by weight of any polymeric chemical. Preferably, the treatment fluid includes less than 1% by weight of any polymeric material. Any polymeric material that may be present should not adversely affect the purposes of the treatment fluid or damage the subterranean formation. Most preferably, the treatment fluid does not include any polymeric material.

In various embodiments, the treatment fluid includes less than 5% by weight of a resin. Preferably, the treatment fluid includes less than 1% by weight of any resin. Any resin that may be present should not adversely affect the purposes of the treatment fluid or damage the subterranean formation. Most preferably, the treatment fluid does not include any resin.

In various embodiments, the treatment fluid includes less than 5% by weight of any chemical that may be susceptible to polymerizing. Preferably, the treatment fluid includes less than 1% by weight of any chemical that may polymerize. Any chemical that may be susceptible to polymerizing should not adversely affect the purposes of the treatment fluid or damage the subterranean formation. Most preferably, the treatment fluid does not include any chemical that may polymerize. It is to be understood that susceptible to polymerizing is in regard to the chemical components of the treatment fluid and the conditions of the treatment fluid from the time of forming the treatment fluid through the time the treatment fluid is placed in a subterranean formation. In other words, for the purposes of this disclosure, any in-situ polymerizations are undesired.

Aromatic chemicals tend to have low biodegradability and in some cases may present health concerns. In various embodiments, the treatment fluid includes less than 5% by weight of any aromatic chemical. Preferably, the treatment fluid includes less than 1% by weight of any aromatic material. Any polymeric material that may be present should not adversely affect the purposes of the treatment fluid or damage the subterranean formation and should not present any health or environmental concerns. Most preferably, the treatment fluid does not include any aromatic chemicals.

In various embodiments of methods according to the disclosure, the treatment fluid has a viscosity of less than 5 cP measured at a shear rate of 511 $\text{sec}^{-1}$.

This disclosure provides a silane-based, low viscosity, fluid composition, that can be used as a treatment fluid in a well. The fluid composition can be adapted to agglomerate the formation sand or fines in a well. In various embodiments, the viscosity of the treatment fluid is low compared to resins, which can help obtain a deeper penetration into a formation. Moreover, a treatment fluid according to the disclosure can agglomerate the fines such that no dislodging of particles by fluid flow through the formation occurs over an extended period of time. In various embodiments, the fluid can be non-damaging to the permeability of a subterranean formation. In various embodiments, a treatment fluid according to the disclosure can provide good regain permeability after a treatment and improved strength of agglomeration.

The methods according to the disclosure can stabilize the formation particulates of sand and fines by agglomerating the particulates in the formation, thereby preventing the fines from migrating. It is believed that the agglomeration does not substantially reduce the permeability of the subterranean formation or damage the subterranean formation.

The term "regain permeability" refers to the percentage of permeability of a portion of a subterranean formation following treatment; that is, it is a percentage of the post-treatment permeability as compared to the pre-treatment permeability. In some embodiments, the methods of the present disclosure are able to achieve a regain permeability of at least about 85%, which is considered a good regain permeability. In some embodiments, the methods of the present disclosure are able to achieve a regain permeability of at least about 90%. In some embodiments of the present disclosure, the regain permeability is at least about 95%.

The various embodiments of methods of the present disclosure are capable of substantially stabilizing the particulates such that loose or weakly consolidated particulates are prevented from shifting or migrating once the treatment is complete. This is particularly significant in the context of portions of formations where it is desirable to control the particulates without having to use a gravel pack. In such situations, the methods of the present disclosure including the use of a screen or liner (which may be an expandable or traditional screen or a perforated or slotted liner, or any similar device known in the art) can act to control particulates to a sufficiently high degree that a gravel pack becomes unnecessary.

Thus, according to the embodiments of the present disclosure that include the use of both a treatment fluid according to the disclosure and a mechanical sand control device such as a screen or liner, the methods create a stable, permeable region around the wellbore that resists particulate migration. The screen or liner can be used, for example, to provide mechanical support to prevent borehole collapse. Such embodiments may make the use of screen-only or liner-only (no gravel pack) completions functional over a much wider range of formation properties than previously thought possible.

In addition, the methods can be used as a remedial treatment to be injected into a treatment zone through a proppant or gravel pack of a previously performed fracturing treatment or gravel pack.

The methods can be performed in vertical, inclined, or horizontal wellbores, and in open-hole or under-reamed completions as well as in cased wells. If a method is to be carried out in a cased wellbore, the casing is perforated to provide for fluid communication with a zone of interest in the subterranean formation.

The methods can optionally include the step of: before or after the step of introducing the treatment fluid, introducing a fracturing fluid into the wellbore at a pressure sufficient to create at least one fracture in the subterranean formation. For example, the composition can be used as a prior treatment to hydraulic fracturing.

First Chemical

A preferred physical property for the first chemical is that it be a liquid under Standard Laboratory Conditions. In addition, another preferred property is that it can be dissolved in water or a 3% KCl solution, at least as it hydrolyzes.

Without necessarily being limited by any theory, the first chemical has only one epoxy group to avoid polymerization and formation of an epoxy resin. However, it is believed the epoxy group of the first chemical can react with the amine group of the second chemical. In an embodiment, the epoxy group of the first chemical is of an alkyl epoxy group on the silicon atom. For example, the alkyl epoxy group can have in the range of 1 to 5 methylene bridges ($-CH_2-$ groups) between the silicon atom and the epoxy group. By way of a further example, the alkyl epoxy group has an oxygen atom ($-O-$) between the silicon atom and the epoxy group.

Without necessarily being limited by any theory, the first chemical has at least one alkoxy group on the silicon atom for reacting with pendant alcohol groups on the surface of silica sand.

In some embodiments, the first chemical has at least two alkoxy groups on the silicon. Such alkoxysilanes can have the property of hydrolyzing in the presence of water to form polymeric silicon compounds such as polysiloxanes and release an alcohol compound. The reaction proceeds via hydrolysis and condensation. Without necessarily being limited by any theoretical explanation, according to the disclosure, such a hydrolysis in the presence of particles comprising silicon dioxide (e.g., quartz or sand) can provide the effect of agglomerating such particles through siloxane linkages —Si—O—Si—. The hydrolysis of the alkoxysilane bond with pendant hydroxyl groups on the silica material can form a bond. Thus, polymeric silicon oxide can form between adjacent particulates and bond them together.

Alkoxysilane means any alkyl groups attached to the silicon atom through an oxygen atom (Si—OR). The terminal alkane groups can be anything from methyl, ethyl, propyl etc. that can be relatively easy to hydrolyze under relatively mild conditions. The longer the alkane or if the alkane is branched, however, the more difficult the hydrolysis tends to be. Accordingly, the alkoxy can be selected to help control the hydrolysis time under various design conditions for use in a well.

Preferably, the alkoxy groups are independently selected from —OR groups wherein R is methyl, ethyl, propyl, isopropyl, butyl, and isobutyl. It is believed that longer chain or branched alkyl groups tend to make the silicon-alkoxy group less reactive. Accordingly, selecting the alkoxy groups to have longer or branched alkyl groups can be used to help control or extend the hydrolysis time. This can be particularly helpful for higher temperature design conditions for a treatment.

Preferably, the first chemical does not have any amine group.

Preferably the first chemical does not have any other type of functional group that would be subject to rapid hydrolysis or free-radical polymerization (e.g., vinyl group polymerization) under the design conditions, which would make the molecule excessively reactive during placement and interfere with the purpose of agglomerating fines in-situ in a subterranean formation. For example, the first chemical preferably does not have any hydroxy or halogen on the silicon atom and preferably does not have any vinyl group.

Preferably the first chemical does not have any aromatic group.

Preferably, the first chemical is in a concentration of about 1% to about 15% v/v of the continuous phase of the treatment fluid. More preferably, the first chemical is in a concentration of about 4% to about 8% v/v of the continuous phase of the treatment fluid. Most preferably, the first chemical in a concentration of about 7.5 v/v.

In various embodiments, the first chemical is selected from the group consisting of:
  (3-glycidoxypropyl)trimethoxysilane,
  (3-glycidoxypropyl)triethoxysilane,
  5,6-epoxyhexyltriethoxysilane,
  (3-glycidoxypropyl)methyldiethoxysilane,
  (3-glycidoxypropyl)methyldimethoxysilane, and
  (3-glycidoxypropyl)dimethylethoxysilane.

Second Chemical

A preferred physical property for the second chemical is that it be a liquid under Standard Laboratory Conditions. In addition, another preferred property is that it can be dissolved in water or a 3% KCl solution, at least as it hydrolyzes. It may also be soluble in an organic solvent such as xylene.

Without necessarily being limited by any theory, the amine of the second chemical is believed to react with the epoxy group of the first chemical. In an embodiment, the second chemical does not have an epoxy group.

In various embodiments, the second chemical is selected from the group consisting of: primary, secondary, or tertiary amines. For example, the second chemical can be selected from the group consisting of:
  aliphatic amines,
  cycloaliphatic amines,
  heterocyclic amines, and
  amidoamines.

In various embodiments, the second chemical is selected from the group consisting of:
  triethylenetetraamine,
  ethylenediamine,
  N-cocoalkyltrimethylenediamine,
  isophoronediamine, and
  diethyltoluenediamine.

In various embodiments, the second chemical additionally comprises at least one alkoxy group on a silicon atom. This can help the second chemical bind with the surface of silica, as discussed above. In some of the embodiments, the second chemical can have at least two alkoxy groups on the silicon. In any of the various embodiments, the alkoxy groups on the silicon atom can be independently selected from an —OR group wherein R is methyl, ethyl, propyl, isopropyl, butyl, and isobutyl.

Preferably, the second chemical does not include any epoxy group.

Preferably, the second chemical does not have any hydroxy or halogen on the silicon atom.

Preferably, the second chemical does not have any vinyl group.

Preferably, the second chemical does not have any aromatic group.

Preferably, the second chemical is in a concentration of about 0.5% to about 10% v/v of the continuous phase of the treatment fluid. More preferably, the second chemical is in a concentration of about 2% to about 5% v/v of the continuous phase of the treatment fluid. Most preferably, the second chemical is in a concentration of about 4% v/v of the continuous phase of the treatment fluid.

In various embodiments, the second chemical is selected from the group consisting of:
  N-[3-(trimethoxysilyl)propyl]ethylenediamine],
  3-aminopropyltriethoxysilane,
  3-aminopropyltrimethoxysilane,
  4-aminobutyltriethoxysilane,
  aminophenyltrimethoxysilane,
  3-aminopropyltris(methoxyethoxy-ethoxy)silane,
  11-aminodecyltriethoxysilane,
  2-(4-pyridylethyl)triethoxysilane,
  3-aminopropyl diisopropylethoxysilane,
  3-aminopropyl dimethylethoxysilane,
  N-(2-aminoethyl)-3-aminopropyl-triethoxysilane,
  N-(6-aminohexyl)aminomethyl-triethoxysilane,
  N-(6-aminohexyl)aminopropyl-trimethoxysilane,
  (3-trimethoxysilylpropyl)diethylene triamine,
  n-butylaminopropyltrimethoxysilane,
  bis(2-hydroxyethyl)-3-aminopropyl-triethoxysilane, and
  3-(N-styrylmethyl-2-aminoethylamino)propyltrimethoxysilane hydrochloride.

Continuous Phase

In various embodiments, the treatment fluid comprises a continuous phase that is aqueous, and wherein the first and second chemicals are dissolved or dispersed in the continuous phase.

Treatment Zone

Preferably, the treatment zone is an unconsolidated or weakly consolidated subterranean formation. Preferably, the treatment zone is in a subterranean formation having loose particulate of silicon dioxide such as sand or quartz particles. For example, the subterranean formation can be a sandstone formation. Preferably, the sandstone formation has at least 70% sandstone material by weight. The formation may include some clay, as the siloxane may bond with the surface of a clay, but if clay is present in more than about 5%, the formation may undesirably swell in the presence of water or 3% aqueous KCl.

The subterranean formation can be, for example, a gas reservoir having a permeability greater than about 5 mD. By way of another example, the subterranean formation can be an oil reservoir having a permeability greater than about 20 mD.

Optional Catalyst

Rates of this hydrolysis are sensitive to the presence of acids and bases, both of which serve as catalysts. Other types of catalysts can be used.

The rate of hydrolysis of an alkoxysilane bond can be increased in the presence of a catalyst. Preferably, the method additionally includes the step of providing a catalyst for hydrolysis of the alkoxysilane in the subterranean formation. The catalyst can be base, acid, or a transition metal. For example, transition metals such as titanium(IV) or zirconium(IV) can catalyze the rate of hydrolysis of an alkoxysilane. Suitable examples of such transition metals include titanium(IV) isopropoxide, titanium(IV) chloride, and zirconium(IV) chloride.

The catalyst can be included in the treatment fluid with the alkoxysilane or it can be desirable to place the catalyst into the treatment zone prior to or after introducing the treatment fluid with the alkoxysilane, for example, as a preflush or postflush fluid.

In an embodiment, the step of providing a catalyst comprises adjusting the pH of the continuous aqueous phase of a preflush fluid to be greater than 9. More preferably, a basic pH is in the range of about 9 to about 12.

In an embodiment, the step of providing a catalyst comprises adjusting the pH of the continuous aqueous phase of a preflush fluid is less than 5. Preferably, an acidic pH is in the range of about 3 to about 5.

In an embodiment, the step of providing a catalyst comprises forming a preflush fluid comprising the catalyst, wherein the catalyst is selected from the group consisting of: titanium(IV), zirconium(IV), and any combination thereof.

Preferably, the catalyst is in a concentration of about 0.1% to about 5% of the continuous phase of the preflush fluid or treatment fluid.

It should be within the ability of one skilled in the art, with the benefit of this disclosure, to select a suitable catalyst for use in embodiments of the present disclosure and to determine whether a catalyst is required to trigger timely curing.

Mechanical Sand Control Device

In various embodiments, additionally comprising, before or after introducing the treatment fluid into the zone, installing a mechanical sand control device in the wellbore of the zone.

Preferably, the mechanical sand control device is selected from the group consisting of: a perforated liner, a slotted pipe, a wire-wrapped screen, a non-expandable screen, and an expandable screen.

Preferably, the mechanical sand control device is not gravel packed.

Optional Steps

In various embodiments, the methods can optionally or advantageously include additional steps.

For example, the treatment zone and job conditions can be selected such that the design temperature is in the range of about 30° C. to about 200° C.

A method according to the disclosure can include a step of, prior to introducing the treatment fluid: isolating a zone of interest in the subterranean.

A treatment fluid can be prepared at the job site.

In certain embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a fluid into a well is within a relatively short period after forming the fluid, e.g., less within 30 minutes to one hour. More preferably, the step of delivering the fluid is immediately after the step of forming the fluid, which is "on the fly."

It should be understood that the step of delivering a treatment fluid into a well can advantageously include the use of one or more fluid pumps.

In an embodiment, the step of introducing is at a rate and pressure below the fracture pressure of the treatment zone. For example, the treatment fluid is introduced to the subterranean formation at a matrix flow rate. That is, the composition is added at such a rate that it is able to penetrate the formation without substantially affecting the structure of the formation sands or proppant or gravel matrixes it encounters.

In an embodiment, the step of introducing a treatment comprises introducing under conditions for fracturing a treatment zone. The fluid is introduced into the treatment zone at a rate and pressure that are at least sufficient to fracture the zone.

The step of introducing the treatment fluid containing the first and second chemicals can be performed either before or after the sand screen installation or gravel packing are completed. It is beneficial to provide a method that transforms small formation sand or fines into larger aggregates. Preferably, this does not reduce permeability of the formation, and the permeability may be increased. This enhances the retention of fines behind the screen without plugging or eroding it.

After the step of introducing a treatment fluid comprising the first and second chemicals, the zone is shut in to allow time for the alkoxysilane functionality to hydrolyze in the well under the design conditions. This preferably occurs with time under the temperature, pressure, and other conditions in the zone.

The methods can include a step of: after the steps of shutting in and installing the mechanical sand control device, producing fluid from the subterranean formation through the mechanical sand control device.

Preferably, the step of shutting in is for at least a sufficient time for at least 50% by weight of the alkoxysilane functionality to hydrolyze in the treatment zone under the design conditions.

In various embodiments, the methods additionally comprising flowing back or producing from the zone without gravel packing the mechanical sand control device.

Preferably, after any such well treatment, a step of producing hydrocarbon from the subterranean formation is the desirable objective and an additional step according to the method.

EXAMPLES

To facilitate a better understanding of the present disclosure, the following examples of certain aspects of some embodiments are given. In no way should the following examples be read to limit, or define, the entire scope of the disclosure.

Representative Treatment Zone with Sand Screen

Referring to the drawing, FIG. 1 illustrates a horizontal open-hole wellbore 10. The wellbore 10 extends into an unconsolidated subterranean formation or zone 12 from a cased wellbore extending to the surface. While wellbore 10 is illustrated as a horizontal open-hole completion, it should be recognized that the present disclosure is also applicable to vertical or inclined wellbores, and to cased wellbores.

A sand screen 20 is located inside wellbore 10. Sand screen 20 has a "cross-over" sub connected to its upper end, which is suspended from the surface on a tubing or work string (not shown). A packer 26 is attached to the crossover. The cross-over and packer 26 are conventional gravel pack forming tools and are well known to those skilled in the art. The packer 26 is used to permit crossover during packing and to isolate a portion of the wellbore. The crossover provides channels for the circulation of gravel slurry to form a gravel pack 42 (shown partially formed) in the annulus 23 on the outside of the sand screen 20 and returns circulation of fluid through the sand screen 20 and up the washpipe 28. The washpipe 28 is attached to the gravel pack service tool and is run inside the sand screen 20. The washpipe 28 is used to force fluid to flow around the bottom section of the sand screen 20.

Sand screen 20 may be of a single length or it may be comprised of a plurality of screen units 35 which are connected together with threaded couplings or the like (not shown). As shown, each of the screen units 35 is basically identical to each other and each is comprised of a perforated base pipe having a continuous length of wrap wire wound thereon, which forms a "screen section" therein. The base pipe can have a plurality of perforations therein, or other types of permeable base pipes, e.g., slotted pipe, etc., can be used without departing from the present disclosure.

It should be understood that in a method according to the disclosure, gravel packing is not necessary.

Core Flow Tests

In an embodiment, a treatment fluid comprises a first chemical of 3-glycidoxypropyl trimethoxysilane (CAS No. 2530-83-8) and a second chemical of N-[3-(trimethoxysilyl)propyl]ethylenediamine] (CAS No. 1760-24-3). A blend of these two chemicals in a continuous phase, such as dimethylformamide ("DMF"), xylene, water, or aqueous, such as 3% KCl. can provide desired strength to agglomerated formation particles under reservoir temperature conditions.

Core flow tests were carried out on sandpacks simulating an unconsolidated subterranean formation to evaluate the effectiveness of treatment with a treatment fluid according to the disclosure. Incremental differential pressure was applied to evaluate particle mobilization without treatment (control test) compared to treatment with the treatment fluid.

Sandpack was prepared using 200 mesh silica and 20/40 mesh sand (50:50) and bentonite clay (2%), with additional layers of 20/40 sand (about 1 cm) at both ends. The two ends of the sandpack were closed using 300 mesh screens. The sandpacks were initially saturated with 3% KCl aqueous solution and initial permeability of the sandpack to the 3% KCl solution was determined.

The example treatment fluid compositions included an example in aqueous 3% KCl: 7.5 ml 3-glycidoxypropyl trimethoxysilane and 4 ml N-[3-(trimethoxysilyl)propyl]ethylenediamine] in 90 ml of 3% KCl.

The example treatment fluid compositions included examples in xylene or DMF: 5 ml 3-glycidoxypropyl trimethoxysilane and 10 ml N-[3-(trimethoxysilyl)propyl]ethylenediamine] in 60 ml xylene or 60 ml DMF.

Through this pack treatment fluid was pumped and pack was shut in for 24 to 72 hours at 185° F. (85° C.).

After predetermined time, final permeability was determined by changing the screen mesh size to 40.

Regained permeability was determined for both cases.

The fluid was also collected for turbidity analysis under different pressures. The turbidity meter was a Systronics Digital Nephelo Turbidity Meter 132.

These tests showed particles are not dislodging after the treatment and agglomeration. A good regained permeability ensures that the fluid does not damage the formation.

After complete curing the core is extruded from the brass sample cell and cut into a core sample size having a length of about 1.5 to 2 times the diameter and then unconfined compressive strength ("UCS") was measured immediately. Good compressive strength was observed.

For the example treatment fluids in DMF or 3% KCl, the results of initial and final permeability and turbidity analysis at 185° F. (85° C.) and the compressive strength measurements are tabulated in Table 1.

TABLE 1

| Permeability | Control Test | Treatment composition in | |
|---|---|---|---|
| | | DMF | 3% KCl |
| Initial Permeability | 250 mD | 100 mD | 385 |
| Final Permeability | | 90 mD | 354 |
| Regained Permeability | — | 90% | 92% |
| Unconfined Compressive Strength (UCS) | — | 550 psi | 625 psi |
| Turbidity analysis Up to 200 psi | 400 NTU | Traces of particles | Undetectable |

A good regained perm observed during the tests definitely ensures that the fluid did not damage the formation.

A fluid collected at 200 psi without the example treatment fluid was highly turbid having a milky appearance; whereas a fluid collected after use of the example treatment fluid provided a clear, transparent solution having the appearance of clean water. The clear solution collected under pressure after treatment confirms that the treatment was able to hold the fines particles up to 200 psi. Whereas in control sample high turbidity value (400 NTU) reveals the continuous flow of fines under pressure due to absence of fines agglomeration.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:

1. A method for treating a zone of a subterranean formation penetrated by a wellbore, the method comprising:
   (A) forming a treatment fluid comprising:
      (i) an aqueous continuous phase;
      (ii) a first chemical having: (a) a single epoxy group; and (b) at least one alkoxy group on a silicon atom, wherein the first chemical is water soluble or dissolves with hydrolysis in the aqueous continuous phase;
      (iii) a second chemical having an amine group, wherein the second chemical is water soluble or dissolves with hydrolysis in the aqueous continuous phase; and
   (B) introducing the treatment fluid through the wellbore into the zone of the subterranean formation,
   wherein the treatment fluid includes less than 5% by weight of any polymeric chemical and any chemicals that may be capable of polymerizing.

2. The method according to claim 1, wherein the treatment fluid does not include any polymeric chemical and any chemicals that may be capable of polymerizing.

3. The method according to claim 1, wherein the treatment fluid does not include any aromatic chemical.

4. The method according to claim 1, wherein the treatment fluid has a viscosity of less than 5 cP measured at a shear rate of 511 sec$^{-1}$.

5. The method according to claim 1, wherein the epoxy group is of an alkyl epoxy group on the silicon atom.

6. The method according to claim 5, wherein the alkyl epoxy group has in the range of 1 to 5 methylene bridges (—$CH_2$— groups) between the silicon atom and the epoxy group.

7. The method according to claim 6, wherein the alkyl epoxy group has an oxygen atom (—O—) between the silicon atom and the epoxy group.

8. The method according to claim 1, wherein the first chemical has at least two alkoxy groups on the silicon.

9. The method according to claim 8, wherein the alkoxy groups on the silicon atom are independently selected from an —OR group wherein R is methyl, ethyl, propyl, isopropyl, butyl, and isobutyl.

10. The method according to claim 1, wherein the first chemical does not have any amine group.

11. The method according to claim 1, wherein the first chemical does not have any hydroxy or halogen on the silicon atom.

12. The method according to claim 1, wherein the first chemical does not have any vinyl group.

13. The method according to claim 1, wherein the first chemical is selected from the group consisting of:
   (3-glycidoxypropyl)trimethoxysilane,
   (3-glycidoxypropyl)triethoxysilane,
   5,6-epoxyhexyltriethoxysilane,
   (3-glycidoxypropyl)methyldiethoxysilane,
   (3-glycidoxypropyl)methyldimethoxysilane, and
   (3-glycidoxypropyl)dimethylethoxysilane.

14. The method according to claim 1, wherein the second chemical does not have an epoxy group.

15. The method according to claim 1, wherein the second chemical is selected from the group consisting of:
   triethylenetetraamine,
   ethylenediamine,
   N-cocoalkyltrimethylenediamine,
   isophoronediamine,
   diethyltoluenediamine,
   N-[3-(trimethoxysilyl)propyl]ethylenediamine],
   3-aminopropyltriethoxysilane,
   3-aminopropyltrimethoxysilane,
   4-aminobutyltriethoxysilane,
   aminophenyltrimehtoxysilane,
   3-aminopropyltris(methoxyethoxy-ethoxy)silane,
   11-aminodecyltriethoxysilane,
   2-(4-pyridylethyl)triethoxysilane,
   3-aminopropyl diisopropylethoxysilane,
   3-aminopropyl dimethylethoxysilane, N-(2-aminoethyl)-3-aminopropyl-triethoxysilane,
N-(6-aminohexyl)aminomethyl-triethoxysilane,
N-(6-aminohexyl)aminopropyl-trimethoxysilane,
(3-trimethoxysilylpropyl)diethylene triamine,
n-butylaminopropyltrimethoxysilane,
bis(2-hydroxyethyl)-3-aminopropyl-triethoxysilane, and
3-(N-styrylmethyl-2-aminoethylamino)propyltrimethoxysilane hydrochloride.

16. The method according to claim 1, additionally comprising, before or after introducing the treatment fluid into the zone, installing a mechanical sand control device in the wellbore of the zone.

17. The method according to claim 1, wherein the subterranean formation is a sandstone formation.

18. A method for treating a zone of a subterranean formation penetrated by a wellbore, the method comprising:
  (A) forming a treatment fluid comprising:
    (i) an aqueous continuous phase;
    (ii) a first chemical having: (a) a single epoxy group; and (b) at least one alkoxy group on a silicon atom, wherein the first chemical is water soluble or dissolves with hydrolysis in the aqueous continuous phase;
    (iii) a second chemical having an amine group, wherein the second chemical is water soluble or dissolves with hydrolysis in the aqueous continuous phase; and
  (B) introducing the treatment fluid through the wellbore into the zone of the subterranean formation,
  wherein the second chemical additionally comprises at least one alkoxy group on a silicon atom.

19. The method according to claim 18, wherein the second chemical has at least two alkoxy groups on the silicon.

20. The method according to claim 19, wherein the alkoxy groups of the second chemical are independently selected from an —OR group wherein R is methyl, ethyl, propyl, isopropyl, butyl, and isobutyl.

* * * * *